United States Patent Office.

RENÉ CUPPER, OF NEW YORK, N. Y.

Letters Patent No. 61,404, dated January 22, 1867.

---

IMPROVEMENT IN EXTRACTING IODINE FROM SEA WATER.

---

The Schedule referred to in these Letters Patent and making part of the same.

---

TO ALL WHOM IT MAY CONCERN:

Be it known that I, RENÉ CUPPER, of No. 599 Broadway, New York city, formerly of Paris, France, have invented a new and useful "Improved Chemical Process;" and I do hereby declare that the following is a full, clear, and exact description thereof, which will enable others skilled in the art to make and use the same.

The present invention relates to the extraction of iodine from sea water, which result I accomplish by precipitation, and in the manner following:

I first prepare a liquor suitable to form in the sea water a compound insoluble in the sea water itself, but sufficiently soluble in pure water, which liquor is composed of the ingredients hereinafter named, mixed together in and about the following proportions, viz: 1 ℔. of sulphate of copper, 2 ℔s. of sulphate of protoxide of iron; 2 ounces of tartaric acid; 2 ounces of tartrate of ammonia, which are mixed together, giving or producing $3\frac{1}{4}$ pounds of salts in solution, that, when used in sea water, will precipitate one pound of iodine to the state of iodotartrate of protoxide of copper. Sea water contains about one part in 25,000 of iodine, to precipitate which it requires $3\frac{1}{4}$ parts of salts, produced by the ingredients above named. The precipitate is then allowed to settle, after which the water is skimmed off, or in any other proper manner removed, when the precipitate is then strained through a cloth or other suitable material, after which it is boiled in a solution of caustic potash, which, uniting with the tartaric acid, and with the iodine, leaves oxide of copper with the oxide of iron carried away by the precipitation. The residue is then reduced in sulphuric acid, which produces a solution of sulphate of copper, and of iron which can be employed or used for another operation similar to that above described. The iodide of potassium in solution with the tartaric acid is separated by cooling the liquor, which leaves the tartrate of potash in the mother or original waters, which can be concentrated for removing the remainder.

I claim as new, and desire to secure by Letters Patent—

The process substantially as herein described, for the purpose specified.

R. CUPPER.

Witnesses:
 ALBERT W. BROWN,
 J. W. B. COVINGTON.